United States Patent [19]

Ogawa et al.

[11] 4,007,151
[45] Feb. 8, 1977

[54] POLYURETHANE COATING COMPOSITION

[75] Inventors: Shinsaku Ogawa; Matsuei Yamanoue; Norio Oyabu, all of Nobeoka, Japan

[73] Assignee: Asahi Kasei Kogyo Kabushiki Kaisha, Osaka, Japan

[22] Filed: June 2, 1975

[21] Appl. No.: 583,221

[30] Foreign Application Priority Data

May 31, 1974 Japan .............................. 49-60761

[52] U.S. Cl. .................... 260/31.2 N; 260/31.4 R; 260/32.8 N; 260/33.6 UB; 260/77.5 MA
[51] Int. Cl.$^2$ ........................................ C08K 5/09
[58] Field of Search ............. 260/77.5 MA, 31.2 N

[56] References Cited

UNITED STATES PATENTS 3,718,622  2/1973  Camilleri et al. ..... 260/77.5 MA X
3,801,532  4/1974  Olstowski ................. 260/31.2 N X

*Primary Examiner*—Lewis T. Jacobs
*Attorney, Agent, or Firm*—Sughrue, Rothwell, Mion, Zinn & Macpeak

[57] ABSTRACT

A solventless polyurethane coating composition having a low viscosity suitable for coating, which comprises (a) an aliphatic or alicyclic polyisocyanate containing at least 3 isocyanate groups, (b) at least ⅓ equivalent, based on the isocyanate groups, of a monohydric alcohol, and (c) a low-molecular-weight polyhydric alcohol having at least 3 active hydrogen atoms. The composition provides coatings having superior properties such as good hardness, weatherability and intimate adhesion to a substrate.

13 Claims, No Drawings

POLYURETHANE COATING COMPOSITION

BACKGROUND OF THE INVENTION

1. Field of the Invention

This invention relates to a new and useful non-yellowing polyurethane coating composition which does not contain any solvent and which has a high solids content. More specifically, it relates to a polyurethane coating composition comprising an aliphatic or alicyclic polyisocyanate containing at least 3 isocyanate groups, a monohydric alcohol in an amount not less than ⅓ of the equivalent weight of the isocyanate groups, and a low-molecular-weight polyhydric alcohol having at least 3 active hydrogen atoms.

2. Description of the Prior Art

Polyurethane coating compositions which comprise aliphatic or alicyclic polyisocyanates containing at least 3 isocyanate groups, high-molecular-weight polyhydric alcohols containing at least 2 hydroxy groups and volatile solvents which do not react with the isocyanates are known in the prior art. Well-known typical examples of the aliphatic or alicyclic polyisocyanates containing at least 3 isocyanate groups include addition reaction products formed between hexamethylene diisocyanate or cyclohexane 1,4-diisocyanate and water or trimethylol propane. Examples of the high-molecular-weight polyhydric alcohols containing at least 2 hydroxy groups are polyethylene glycol, polypropylene glycols, or acrylic polyols or polyester polyols derived from esters formed between these glycols and dicarboxylic acids. The solvent which does not react with the isocyanates may, for example, be a volatile low-viscosity solvent such as benzene, xylene, ethyl acetate, methyl ethyl ketone or ethylene glycol monoethyl ether acetate.

It is well known that conventional polyurethane coating compositions obtained using these components have ideal characteristics with regard to weatherability, durability, intimate adhesion to a substrate, flexural resistance, abrasion resistance and soil resistance when used as paints. It has been thought, however, that in order to attain these characteristics, the polyhydric alcohol to be used must have as high a molecular weight as possible or otherwise, the degree of crosslinking of the cross-linked coating composition would become excessively high deteriorating its flexural resistance and adhesive properties. Moreover, because aliphatic or alicyclic polyisocyanates are expensive and the higher molecular weights of relatively inexpensive polyhydric alcohols per equivalent thereof renders the resulting coating composition less expensive, inexpensive polyhydric alcohols with the highest possible molecular weight have found wide acceptance.

Consequently, polyhydric alcohols having a high viscosity (above about 1000 centipoises) have been exclusively used in the past. On the other hand, known polyisocyanates have a viscosity of at least about 8000 centipoises at 25° C in the absence of a solvent. Since the viscosity of the polyisocyanates must be reduced to about 300 centipoises or less, if possible to about 50 centipoises or less, in order to render the polyisocyanates coatable as a coating agent, the addition of a volatile low-viscosity solvent which does not react with the isocyanates has been considered essential in order to reduce their viscosity.

Polyisocyanates react with high-molecular-weight polyhydric alcohols, but their solubility in each other is not necessarily good. Accordingly, in order to obtain a homogeneous reaction product, in the past the addition of a solvent has been considered essential. Thus, when conventional polyurethane coating compositions are coated, the practice is to incorporate a solvent, usually in an amount exceeding the equivalent weight, into the composition.

The solvent, however, involves the danger of a fire, is toxic to humans, and causes a serious pollution problem at the time of its volatilization. It is also known that, although aliphatic or alicyclic polyisocyanates have superior properties such as weatherability or non-yellowing property, they exhibit a very slow rate of reaction as compared with aromatic polyisocyanates, and about two days are required for aliphatic or alicyclic polyisocyanates to solidify at room temperature (e.g., about 20°–30° C), and therefore, that these coating agents tend to be difficult to handle.

Japanese Patent Application (OPI) No. 103624/73 discloses a solventless urethane coating composition comprising a liquid urethane prepolymer containing 0.90 to 1.50 equivalents, based on the hydroxyl group, of at least 3 terminal isocyanate groups, 50 to 90 mol% of a polyhydric alcohol containing at least 2 hydroxyl groups and 10 to 50 mol% of a high boiling alcohol containing one hydroxyl group.

The viscosity of a coating agent is desirably about 15 to 65 centipoises for spray coating, at most about 300 centipoises, preferably 30 to 85 centipoises, for electrostatic coating, and about 100 to 150 centipoises for brush coating. Thus, taking these coating methods into consideration, the preferred upper limit of the viscosity is about 300 centipoises. It has been found, however, that if no solvent is used, or if the amount of solvent is less than 20% by weight, sufficiently feasible polyurethane coating compositions with such a low viscosity cannot be obtained using conventional techniques.

It has been found that in order to obtain a coatable urethane composition having a viscosity of not more than about 300 centipoises at 25° C even in the absence of a volatile organic solvent which does not react with an isocyanate, a monohydric alcohol is incorporated in a larger amount than in the conventional compositions thereby to reduce the viscosity of the composition, and a low-molecular-weight polyhydric alcohol is incorporated thereby to form cross-links after reaction and to provide coatings with good properties.

SUMMARY OF THE INVENTION

Accordingly, an object of this invention is to provide a solventless polyurethane coating composition having a low viscosity and comprising an aliphatic or alicyclic tri- or higher-isocyanate, a monohydric alcohol, and a low-molecular-weight polyhydric alcohol, which provides coatings having superior properties.

These and other objects and advantages of this invention will become apparent from the following description.

The present invention provides a polyurethane coating composition comprising (a) an aliphatic or alicyclic polyisocyanate containing at least 3 isocyanate groups, (b) a monohydric alcohol in an amount of at least ⅓ of the equivalent weight of the isocyanate groups and (c) a low-molecular-weight polyhydric alcohol containing at least 3 active hydrogen atoms capable of reacting with the isocyanate.

DETAILED DESCRIPTION OF THE INVENTION

In the prior art, the use of a liquid urethane prepolymer containing at least 3 isocyanate groups per molecule is to obtain a three-dimensional cross-linked structure, and no idea of adding the monohydric alcohol in an amount not less than ⅓ of the isocyanate groups has been suggested. In the above-cited Japanese Patent Application (OPI) No. 103624/73, the largest proportion of the monohydric alcohol is 50 mol%, when the proportion of the dihydric alcohol is 50 mol%. In terms of hydroxyl group equivalent percent, this corresponds to 33.3% of the monohydric alcohol, and 66.6% of the dihydric alcohol. In this case, it is theoretically impossible to obtain a three-dimensional cross-linked structure, and a hard, tough coating can not be obtained.

In the present invention, the monohydric alcohol is mixed with the aliphatic or alicyclic polyisocyanate in an amount not less than one-third equivalent of the isocyanate groups. Generally, low-molecular-weight monohydric alcohols react at higher rates than trihydric alcohols, and therefore, during the course of reaction, isocyanate prepolymers with difunctional groups are produced. In the present invention, however, cross-linking with the prepolymers is not expected at all. Rather, the formation of a three-dimensional cross-linked structure is achieved mainly by incorporating a polyhydric alcohol containing at least 3 active hydrogen atoms which can react with the isocyanate. According to this concept, the monohydric alcohol is used in large quantities. Thus, if monohydric alcohols having sufficiently low viscosities are used, they act as a viscosity-reducing agent for the resulting compositions, and the viscosity of the compositions can be reduced to an extent that they can be coated with commercial feasibility.

If the amount of the monohydric alcohol is too large, a three-dimensional cross-linked structure cannot be obtained even if a polyhydric alcohol such as a triol is used in the composition, but the resulting polyurethane coating composition is too soft, and it is not expected to have feasible chemical corrosion resistance.

The upper limit of the amount of the monohydric alcohol where this undesirable condition occurs is greater with increasing number of isocyanate groups per molecule of the polyisocyanate, but for practical purposes, the upper limit is ⅔ equivalent of the isocyanate groups. For example, with polyisocyanates having 3 isocyanate groups per molecule, the addition of monohydric alcohols in an amount exceeding ⅔ equivalent no longer results in a three-dimensional cross-linked structure.

The monohydric alcohols used in this invention must be quite effective in reducing the viscosity of the composition, must increase the solubility of the polyisocyanate and the polyhydric alcohol in each other and if possible dissolve the polyisocyanate and the polyhydric alcohol uniformly, must be as nonvolatile as possible, must control the degree of cross-linking to impart suitable properties to the coating, and must be as inexpensive as possible. Although such will differ depending on the ultimate end-use, suitable monohydric alcohols which can be used in this invention are those having a molecular weight of about 32 to about 150. Examples of suitable monohydric alcohols are methyl alcohol, ethyl alcohol, isopropyl alcohol, n-butyl alcohol, isobutyl alcohol, secondary butyl alcohol, amyl alcohol, isoamyl alcohol, 3-pentanol, cyclohexanol, n-hexanol, methylamyl alcohol, n-heptyl alcohol, octanol, Cellosolve (Cellosolve is a registered trademark for ethylene glycol monoethyl ether), methyl Cellosolve (trademark for ethylene glycol monomethyl ether), butyl Cellosolve (trademark for ethylene glycol monobutyl ether), furfuryl alcohol, 3-methoxy-1-butanol, propylene glycol monobutyl ether, 2-hydroxyethyl methacrylate, 2-hydroxypropyl methacrylate, and 2-hydroxyethyl acrylate.

It is essential in the present invention that a polyhydric alcohol containing at least 3 active hydrogen atoms capable of reacting with the isocyanate be present in the composition. The preferred amount of the polyhydric alcohol is at least 0.1 equivalent but not more than ⅔ equivalent of the isocyanate. The amount of the polyhydric alcohol controls the degree of crosslinking, which in turn contributes to a control of the corrosion resistance, hardness, intimate adhesion to a substrate, and flexural strength of the coating obtained.

Polyhydric alcohols having a molecular weight of more than about 400, which have frequently been used in the past, are not preferred because of their high viscosity. Preferably, therefore, polyhydric alcohols containing at least 3 active hydrogen atoms capable of reacting with the isocyanate are those having a molecular weight of about 70 to 200. Examples of suitable polyhydric alcohols are triols such as glycerol, trimethylolethane, trimethylolpropane, 1,2,6-hexanetriol, etc.; tetraols such as pentaerythritol, etc.; and polyols having at least one active hydrogen atom other than that of a hydroxy group such as diethanolamine, triethanolamine, etc.

Some of these polyhydric alcohols are normally solid, and are not necessarily easily miscible with the polyisocyanates. Accordingly, preferably the polyhydric alcohol is mixed first with a suitable proportion of a monohydric alcohol which dissolves both the polyhydric alcohol and the polyisocyanate and increases the solubility of the polyhydric alcohol and the polyisocyanate in each other, and then the resulting solution is mixed with the polyisocyanate. In the prior art, it would not have been expected that the use of such a low-molecular-weight polyhydric alcohol would provide coatings with very superior properties.

If desired, a dihydric alcohol not having any active hydrogen atom other than those hydroxyl groups can be incorporated in a small amount in the coating composition of this invention in order to improve the flexural strength and impact strength of the resulting coating. Such a dihydric alcohol preferably has a low molecular weight of about 62 to 200. The addition of the above-described dihydric alcohol sometimes improves the miscibility of the polyhydric alcohol with the polyisocyanate. The amount of the above-described dihydric alcohol is about ⅔ equivalent or less based on the isocyanate group.

Examples of suitable dihydric alcohols are 1,4-butanediol, 1,5-pentanediol, ethylene glycol, diethylene glycol, triethylene glycol, tetraethylene glycol, neopentyl glycol, propylene glycol, 1,3-butanediol, and 2,3-butanediol.

The isocyanate equivalent is 0.7 to 2.0, preferably 0.8 to 1.5, based on the total hydroxy group equivalent. If the proportion of the isocyanate groups exceeds an isocyanate equivalent of 2.0, the resulting coating composition becomes expensive and is not preferred for practical applications. Furthermore, a mixed solution of the coating composition with alcohols is not preferred since its viscosity increases. On the other hand, if the proportion of the isocyanate groups is too low, the water resistance, solvent resistance and hardness of the resulting coating deteriorate, and feasible properties cannot be obtained.

Typical examples of aliphatic or alicyclic polyisocyanates containing at least 3 isocyanate groups are adducts formed between ethylene diisocyanate, tetramethylene diisocyanate, hexamethylene diisocyanate, cyclohexane-1,4-diisocyanate, 2,6-diisocyanate methyl caproate and water and/or polyhydric alcohols such as triols, e.g., trimethylol propane, hexane triol, glycerol, trimethylol ethane, etc. or tetraols, e.g., pentaerythritol, etc. These adducts can be used either alone or in admixture, and a suitable molecular weight of these adducts can range from about 200 to 800.

Coating compositions prepared from these aliphatic or alicyclic polyisocyanate adducts especially have superior characteristics with respect to weatherability and non-yellowing property. These adducts are liquid at room temperature (e.g., about 20°–30° C), and it is easy to prepare low-viscosity coating compositions from these adducts. Desmodur N (trade name, produced by Bayer AG; an adduct formed between hexamethylene diisocyanate and water) and Coronate HL (trade name, produced by Nippon Polyurethane Co., Ltd.; an adduct formed between hexamethylene diisocyanate and trimethylol propane) are examples of commercially available polyisocyanate adducts. Adducts between a saturated aliphatic diisocyanate such as ethylene diisocyanate, tetramethylene diisocyanate or hexamethylene diisocyanate and water, if prepared by a proper method in which the reaction is conducted in an appropriate hydrophilic organic solvent such as an ester, an amide, etc., are available in varying low viscosities ranging from about 3000 centipoises to about 300 centipoises (at 25° C), and are most suited for the objects of this invention.

However, with these water adducts, formation of a trace amound of an adduct composed of 4 or more isocyanate molecules other than a pure adduct composed of 3 isocyanate molecules can not be avoided. The amount of the monohydric alcohol to be added to these adducts thus must be increased.

Since the monohydric alcohol can be incorporated in a larger proportion and the viscosity of the mixture can be more easily reduced with higher concentrations of the isocyanate groups in the adduct, the use of adducts having an isocyanate group concentration of 23% to 41% by weight is especially preferred.

Naturally, the viscosity of the mixture can be more easily reduced using adducts having lower viscosities, and therefore, adducts with a viscosity of not more than about 3000 centipoises at 25° C are preferred. By using such an adduct and selecting a suitable monohydric alcohol, a coatable composition having a viscosity of not more than about 300 centipoises at 25° C can be prepared without using a solvent in the composition.

Coating compositions obtained by mixing an aliphatic or alicyclic polyisocyanate containing at least 3 isocyanate groups, a high viscosity polyhydric alcohol and a solvent in accordance with conventional techniques have good properties, but exhibit a slow rate of reaction and require about 6 days to cure at room temperature in the absence of a catalyst. In contrast, the low-molecular-weight alcohols used in this invention generally exhibit a fast rate of reaction, and when no solvent is used, there is no volatilization of solvent. Hence, the rate of reaction increases, and the coating composition obtained cures in about one day at room temperature in the absence of a catalyst.

Adducts containing at least 3 isocyanate groups prepared from aromatic diisocyanates such as toluene diisocyanate or metaphenylene diisocyanate and water or trimethylol propane are not used in this invention. These adducts are frequently available as crystals or with viscosities as high as about 20,000 centipoises or more. Furthermore, these adducts exhibit a rate of reaction which is too fast, and in the absence of a solvent, mixtures of these adducts with alcohols show a rate of curing which is too fast for practical use. Coatings of compositions prepared from these adducts have poor weatherability, tend to yellow, and cracks develop in coatings produced therefrom on outdoor exposure for long periods of time.

The polyurethane coating compositions of this invention are generally characterized by the absence of a solvent. If desired, however, a small amount (up to about 20% by weight based on the weight of the entire composition) of a solvent which does not react with the isocyanate can be added in order to obtain compositions with still lower viscosities. If the amount of the solvent is within this range, toxicity to humans and risks of fire can be reduced to a negligible degree. Examples of suitable solvents which can be used include methyl ethyl ketone, ethyl acetate, toluene, xylene, and Cellosolve Acetate.

The coating composition of this invention can be cured either at room temperature or at an elevated temperature (e.g., room temperature to about 180° C). The coating composition is useful as polyurethane paints in general, and can be used to coat a wide range of substrate materials such as iron, aluminum, copper, ceramic ware, paper, rubber, leather, artificial leather, cloth, fibrous products, wood, synthetic wood, plastic products, and glass. Since a volatile organic solvent which does not react with the isocyanate is not used, or, if present, is used in only a small amount, in the coating composition of this invention, the risk of fire, toxicity to humans and the problem of air pollution at the time of coating is almost nil. Moreover, in the absence of a solvent, the coating composition can be applied as a thick layer at one time, and it is not necessary to apply the coating composition as thin layers one on top of another. This greatly shortens the time required for coating.

The following Examples and Comparative Examples are given to illustrate the present invention in greater detail. Unless otherwise indicated herein, all parts, percents, ratios and the like are by weight. The properties shown in the following examples were measured by the following methods.

Pot Life

The number of days required for curing when the composition is allowed to stand at 20° C and 60% RH.

Pencil Hardness

Measured in accordance with JIS-K5401 (after heat-curing at 120° C for 1 hour or after curing at normal temperature (20° C) for 7 days).

Impact Deformation Test

Measured in accordance with JIS-K5400 using an impact deformation tester (6.35 mm, 500 g load, 50 cm falling distance).

Erichsen Test

Using an Erichsen tester, the amount of deformation (in mm) until cracking and breakage of the coating was observed.

Outdoor Exposure Test

The sample was exposed outdoors for 17 months, and then the degree of yellowing and peeling were examined.

EXAMPLE 1

One equivalent of an adduct formed between hexamethylene diisocyanate and water and having an isocyanate concentration of 24.5% by weight and a viscosity of 1400 centipoises at 25° C was mixed with each of the monohydric alcohols shown in Table 1 below and trimethylol propane (hereinafter, TMP) in the proportions indicated in Table 1.

Table 1

| Example No. | Polyisocyanate Equivalent | Monohydric Alcohol | | Polyhydric Alcohol | | Weight Ratio | | |
|---|---|---|---|---|---|---|---|---|
| | | Kind | Equivalent | Kind | Equivalent | Polyisocyanate | Monohydric Alcohol | Polyhydric Alcohol |
| 1-(1) | 1 | iso-Butanol | 0.49 | TMP* | 0.51 | 74 | 16 | 10 |
| 1-(2) | 1 | Cellosolve | 0.47 | TMP | 0.53 | 72 | 18 | 10 |
| 1-(3) | 1 | Butyl Cellosolve | 0.44 | TMP | 0.56 | 69 | 21 | 10 |
| 1-(4) | 1 | 3-Methoxy-butanol | 0.46 | TMP | 0.54 | 70 | 20 | 10 |

*TMP: Trimethylol Propane

The viscosities (at 25° C) of the resulting compositions immediately after mixing are shown in Table 4 below.

Each of the coating compositions obtained was applied to a mild steel panel in a thickness of 2 mils, and the various properties of the coating were determined. The results obtained are shown in Table 4.

As is clear from the results shown in Table 4, all of the coating compositions obtained according to the present invention have a viscosity of about 250 cps or less, and further are excellent coating compositions having the property that one day is required for curing. Moreover, it was confirmed that no damage was observed in the impact deformation test at a distance of 50 cm from the surface of the resulting coating and that all of the resulting coatings have a pencil hardness of 4 H or higher.

Still further, when the composition of Example 1-(1) was mixed with 5% by weight of methyl ethyl ketone as a solvent, a product having a viscosity of about 100 cps or less (25° C) can be obtained. The properties of the coating obtainable from this product were found to be almost the same as those of the coating obtainable from the product not containing any solvent.

EXAMPLE 2

The same adduct as used in Example 1 was mixed with Cellusolve, trimethylol propane (TMP), and glycerol or hexanetriol in the equivalent proportions indicated in Table 2.

Table 2

| Example No. | Polyisocyanate Equivalent | Monohydric Alcohol | | Polyhydric Alcohol | | Trihydric Alcohol | | Weight Ratio | | | |
|---|---|---|---|---|---|---|---|---|---|---|---|
| | | Kind | Equivalent | Kind | Equivalent | Kind | Equivalent | Polyisocyanate | Monohydric Alcohol | Polyhydric Alcohol | Trihydric Alcohol |
| 2-(1) | 1 | Cellosolve | 0.41 | TMP* | 0.36 | Glycerin | 0.23 | 74 | 16 | 7 | 3 |
| 2-(2) | 1 | Cellosolve | 0.41 | TMP | 0.36 | Hexanetriol | 0.23 | 74 | 16 | 7 | 4 |

*Trimethylol Propane

The various properties determined in the same way as in Example 1 are shown in Table 4 below.

All of the resulting compositions were confirmed to be excellent coating compositions and excellent coatings can be obtained therefrom.

EXAMPLE 3

An adduct of hexamethylene diisocyanate and water commercially available as Desmodur N had an isocyanate concentration of 20.7% and a viscosity at 25° C of 8700 centipoises in the absence of a solvent.

One equivalent of Desmodur N was mixed with 0.5 equivalent of Cellosolve and 0.5 equivalent of TMP (trimethylol propane). The resulting composition had a viscosity of 800 centipoises at 25° C. By adding 20% by weight of methyl ethyl ketone to the composition, the viscosity of the composition was reduced to below 100 centipoises.

The composition was coated on a mild steel panel in the same way as in Example 1, and allowed to stand for 7 days at room temperature. The resulting coating had a pencil hardness of 3H. The other properties of the coating are shown in Table 4 below.

The properties of the composition obtained, which were determined from the impact deformation tests, Erichsen test, outdoor exposure test, and the like, were found to be almost the same as those of the compositions obtained in Example 1 and the like.

EXAMPLE 4

One equivalent of an adduct of tetramethylene diisocyanate and water having an isocyanate concentration of 28.5% by weight and a viscosity of 1200 centipoises at 25° C was mixed with 0.4 equivalent of butyl Cellosolve and 0.6 equivalent of TMP (trimethylol propane). The resulting composition had a viscosity of 100 centipoises at 25° C.

The properties of a coating obtained by coating this composition in the same way as in Example 1 are shown in Table 4 below.

EXAMPLE 5

One equivalent of an adduct of hexamethylene diisocyanate and trimethylol propane (isocyanate conc.: 16%, viscosity 10,000 cps) was mixed with 0.4 equivalent of isobutanol, 0.6 equivalent of TMP (trimethylol propane) and 20% by weight of Cellosolve Acetate. The resulting coating composition was coated on a mild steel panel in the same way as in Example 1, and the properties of the resulting coating were determined. The results obtained are shown in Table 4 below.

EXAMPLE 6

One equivalent of the same isocyanate adduct as in Example 1 was mixed with 0.4 equivalent of isobutanol, 0.3 equivalent of 1,5-pentanediol, 0.3 equivalent of trimethylol propane to prepare a coating composition having a viscosity of 25 centipoises at 25° C.

The coating composition was applied to a mild steel panel in the same way as in Example 1, and the properties of the coating obtained were determined. The results obtained are shown in Table 4 below.

EXAMPLE 7

One equivalent of an adduct of cyclohexane-1,4-diisocyanate and trimethylol propane (isocyanate conc.: 17%) was mixed with 0.4 equivalent of 3-methoxybutanol, 0.2 equivalent of diethylene glycol, 0.3 equivalent of trimethylol propane, and 20% by weight of ethyl acetate. The resulting coating composition was coated on a mild steel panel in the same way as in Example 1, and the properties of the resulting coating were determined. The results obtained are shown in Table 4 below.

After the outdoor exposure test for 17 months, the resulting coating did not turn a yellow color to give an excellent weatherable coating.

EXAMPLE 8

One equivalent of the same adduct as used in Example 1, which was formed between hexamethylene diisocyanate and water, (isocyanate conc.: 24.5%, viscosity: 1,400 cps), was mixed with 0.6 equivalent of 2-hydroxyethylmethacrylate and 0.4 equivalent of TMP (trimethylol propane).

After, measurement of the viscosity of the resulting composition, the properties of a coating obtained by coating this composition in the same way as in Example 1 are shown in Table 4 below.

COMPARATIVE EXAMPLE 1

One equivalent of the same adduct of hexamethylene diisocyanate and water as used in Example 1 was mixed with 0.2 equivalent of Cellosolve and 0.8 equivalent of trimethylol propane. The viscosity of the resulting composition was measured, and the composition was coated in the same way as in Example 1. The properties of the resulting coating were determined. The results are shown in Table 4 below. A uniform coating could not be obtained from the resulting composition since an amount of undissolved materials of trimethylol propane remained, and the properties also could not be measured.

COMPARATIVE EXAMPLE 2

One equivalent of the same adduct of hexamethylene diisocyanate as used in Example 1 was mixed with 0.8 equivalent of Cellosolve and 0.2 equivalent of trimethylol propane. The viscosity of the resulting coating composition was measured. The resulting composition was coated on a mild steel panel in the same way as in Example 1, and the properties of the resulting coating were measured. The results obtained are shown in Table 4 below. As is clear from the results shown in Table 4 below, this coating was too soft so that it was practically unusable.

As set forth in Comparative Examples 1 and 2, where the monohydric alcohol is present in the composition, either in too large an amount or in too small an amount, the objects of this invention can not be attained.

COMPARATIVE EXAMPLE 3

One equivalent of the same adduct of hexamethylene diisocyanate and water as used in Example 3 (Desmodur N; viscosity: 8700 centipoises at 25° C; isocyanate concentration: 20.7%) was mixed with 0.4 equivalent of n-butyl alcohol, 0.6 equivalent of a Desmophen No. 651 (a trade mark of Bayer A.G.; a polyester polyol having an OH group content of 8%) and 20% by weight of methyl ethyl ketone were mixed. The blending weight ratio employed is shown in Table 3 below. The viscosity of the resulting composition was measured and is shown in Table 4 below.

Coating using the resulting composition was attempted in the same way as in Example 1, but it was impossible to carry out the coating since the viscosity of the composition was too high, i.e., 600 cps. That is, this demonstrated that when the polyhydric polyol is used, the viscosity of the above composition does not decrease to about 300 cps or less even if the composition contains 20% by weight of methyl ethyl ketone.

COMPARATIVE EXAMPLE 4

One equivalent of the adduct of hexamethylene diisocyanate and water same as used in Example 1 was mixed with 0.4 equivalent of Cellosolve, 0.6 equivalent of the same polyester polyol as used in Comparative Example 3, and 20% by weight of methyl ethyl ketone. The viscosity of the resulting coating composition was measured. The blending weight ratio employed is shown in Table 3 below. The coating composition was coated on a mild steel panel in the same way as in Example 1, and the properties of the resulting coating were measured. The results obtained are shown in Table 4 below. In case where the polyhydric polyol is applied to the polyisocyanate having low viscosity, the viscosity of the resulting composition decreases, but the properties thereof are inferior.

COMPARATIVE EXAMPLE 5

With (1) 2.5 equivalents or (2) 0.5 equivalent of the adduct of hexamethylene diisocyanate and water as used in Example 1, were mixed 0.5 equivalent of Cellosolve and 0.5 equivalent of trimethylol propane (TMP). The blending weight ratios employed are shown in Table 3 below. Then, the viscosity of each of the resulting compositions was measured and the properties thereof were measured in the same way as in Example 1. The results obtained are shown in Table 4 below. This demonstrated that when the polyisocyanate is present in an excess amount, only coatings having inferior properties are obtained.

COMPARATIVE EXAMPLE 6

One equivalent of Desmodur N as used in Comparative Example 3 was mixed with 1 equivalent of the polyester polyol as used in Comparative Example 3 and 250% by weight of n-butyl acetate. The blending weight ratio employed is shown in Table 3 below. Coating was carried out in the same way as in Example 1, and the properties of the resulting coating were measured. The results obtained are shown in Table 4 below.

Table 3

| Example No. | Weight Ratio of Mixed Solution | | | | | | Equivalent Ratio of Mixed Solution | | | | |
|---|---|---|---|---|---|---|---|---|---|---|---|
| | Iso-cyanate | n-Butyl Alcohol | Cello-solve | TMP* | Polyester Polyol | Solvent | Iso-cyanate | n-Butyl Alcohol | Cello-solve | TMP* | Polyester Polyol |
| Ref.Ex. 3 | 56.2 | 8.4 | — | — | 35.4 | 26 | 100 | 40 | — | — | 60 |
| Ref.Ex. 4 | 51.2 | — | 10.8 | — | 38.0 | 22 | 100 | — | 50 | — | 60 |
| Ref.Ex. 5-(1) | 86.4 | — | 9.1 | 4.5 | — | — | 250 | — | 50 | 50 | — |
| Ref.Ex. 5-(2) | 56.0 | — | 29.4 | 14.6 | — | — | 50 | — | 50 | 50 | — |
| Ref.Ex. 6 | 100 | — | — | — | 69 | 250 | 100 | — | — | — | 100 |

*Trimethylol Propane

Table 4

| Example No. | Composition | | Heat-Curing at 120° C, 1 hr. | | | Normal Temperature-Curing (20° C, 7 Days) | | | |
|---|---|---|---|---|---|---|---|---|---|
| | Viscosity (at 25° C) | Pot Life | Impact Deformation Test | Erichsen Test | Pencil Hardness | Impact Deformation Test | Erichsen Test | Pencil Hardness | Outdoor Exposure Test |
| | (cps) | (day) | (cm) | (mm) | | (cm) | (mm) | | |
| Example | | | | | | | | | |
| 1-(1) | 250 | 1 | — | — | 3H | >50 | >8 | 4H | Nil |
| 1-(2) | 160 | 1 | — | — | 3H | >50 | >8 | 4H | Nil |
| 1-(3) | 180 | 1 | — | — | 3H | >50 | >8 | 4H | Nil |
| 1-(4) | 190 | 1 | — | — | 3H | >50 | >8 | 4H | Nil |
| 2-(1) | 210 | — | 50 | 8 | 2H | — | — | — | — |
| 2-(2) | 210 | — | 50 | 8 | 2H | — | — | — | — |
| 3 | 100 | 1 | — | — | — | 50 | 8 | 3H | Nil |
| 4 | 100 | 1 | — | — | — | 50 | 8 | H | Nil |
| 5 | 150 | 1 | 30 | 8 | 4H | — | — | — | Nil |
| 6 | 25 | 1 | 50 | 8 | 2H | — | — | — | Nil |
| 7 | — | — | — | — | — | — | — | — | Nil |
| 8 | 150 | 1 | 50 | 8 | 2H | — | — | — | Nil |
| Reference Example | | | | | | | | | |
| 1 | | | | | Not measurable | | | | |
| 2 | 70 | 1 | 30 | 8 | 6B | — | — | — | — |
| 3 | 600 | 1 | | | Coating Impossible | | | | |
| 4 | 300 | 1 | 20 | 8 | HB | — | — | — | — |
| 5-(1) | 250 | 1 | 10 | — | 3B | — | — | — | — |
| 5-(2) | 50 | 1 | <10 | — | 6B | — | — | — | — |
| 6 | 20 | 2 | — | — | — | 10 | 7.9 | F | Nil |

While the invention has been described in detail and with reference to specific embodiments thereof, it will be apparent to one skilled in the art that various changes and modifications can be made therein without departing from the spirit and scope thereof.

What is claimed is:

1. A polyurethane coating composition comprising an aliphatic or alicyclic polyisocyanate containing at least 3 isocyanate groups; at least ⅓ equivalent, based on the isocyanate groups, of a monohydric alcohol; and a low-molecular-weight polyhydric alcohol containing at least 3 active hydrogen atoms capable of reacting with the isocyanate.

2. The composition of claim 1, wherein the proportion of said monohydric alcohol is ⅓ to ⅔ equivalent based on the isocyanate groups, and the proportion of said polyhydric alcohol is ⅔ to 0.1 equivalent based on the isocyanate groups.

3. The composition of claim 1, wherein the isocyanate equivalent is 0.7 to 2.0 based on the total hydroxyl equivalent.

4. The composition of claim 3, wherein the isocyanate equivalent is 0.8 to 1.5 based on the total hydroxyl equivalent.

5. The composition of claim 1, wherein said polyisocyanate is an adduct of hexamethylene diisocyanate and water.

6. The composition of claim 1, wherein said polyisocyanate has an isocyanate concentration of at least 23% by weight and a viscosity of about 3000 centipoises or less at 25° C.

7. The composition of claim 1, werein said monohydric alcohol has a molecular weight of about 150 or less.

8. The composition of claim 1, wherein said polyhydric alcohol has a molecular weight of about 200 or less.

9. The composition of claim 1, wherein said monohydric alcohol is ethylene glycol monoethyl ether.

10. The composition of claim 1, wherein said polyhydric alcohol is trimethylol propane.

11. The composition of claim 1, additionally including a dihydric alcohol.

12. The composition of claim 1, additionally including about 20% or less by weight, based on the entire composition, of a volatile organic solvent which does not react with the isocyanate.

13. The composition of claim 11, additionally including about 20% or less by weight, based on the entire composition, of a volatile organic solvent which does not react with the isocyanate.

* * * * *